(12) United States Patent
Chen et al.

(10) Patent No.: US 9,965,570 B2
(45) Date of Patent: May 8, 2018

(54) PERFORMING PREDICATE EVALUATION ON COMPRESSED CHARACTER STRING OF VARIABLE LENGTH

(71) Applicant: INTERNATIONAL BUSINESS MACHINES CORPORATION, Armonk, NY (US)

(72) Inventors: Xing Chen, Beijing (CN); Shaorong Liu, Evanston, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 14/711,907

(22) Filed: May 14, 2015

(65) Prior Publication Data
US 2015/0379119 A1  Dec. 31, 2015

(30) Foreign Application Priority Data
Jun. 27, 2014  (CN) .......................... 2014 1 0301261

(51) Int. Cl.
*G06F 7/00* (2006.01)
*G06F 17/30* (2006.01)

(52) U.S. Cl.
CPC .............................. *G06F 17/30985* (2013.01)

(58) Field of Classification Search
CPC ......... G06F 17/30985; G06F 17/30722; G06F 17/30675; G06F 17/30312; G06F 17/30595; G06F 17/30952
See application file for complete search history.

(56) References Cited

U.S. PATENT DOCUMENTS

| | | | | |
|---|---|---|---|---|
| 5,414,834 A * | 5/1995 | Alexander | ........ | G06F 17/30595 |
| 6,006,232 A * | 12/1999 | Lyons | ............... | G06F 17/30595 |
| 7,747,585 B2* | 6/2010 | Barsness | ........... | G06F 17/30445 |
| | | | | 348/14.13 |
| 7,868,789 B1* | 1/2011 | Binnig | .............. | G06F 17/30454 |
| | | | | 341/51 |

(Continued)

FOREIGN PATENT DOCUMENTS

| | | |
|---|---|---|
| CN | 102103538 A | 6/2011 |
| EP | 1504377 B1 | 6/2011 |

OTHER PUBLICATIONS

EP0079465A2, Published May 1989, by European Patent Office.*

(Continued)

*Primary Examiner* — Daniel Kuddus
(74) *Attorney, Agent, or Firm* — Cantor Colburn LLP

(57) ABSTRACT

Methods, devices and computer program products for performing predicate evaluation on a compressed variable length character string are disclosed. Aspects include determining upper and lower boundaries of a false positive range for a predicate, the false positive range for the predicate being a range in which a result of the predicate evaluation may lead to a false positive error. Aspects also include compression-encoding the upper and lower boundaries of the false positive range and performing a first comparison for comparing the compressed variable length character string with the compression-encoded upper and lower boundaries of the false positive range. Aspects further include determining a result of the predicate evaluation based on at least a result of the first comparison processing.

14 Claims, 5 Drawing Sheets

(56) References Cited

U.S. PATENT DOCUMENTS

| | | | |
|---|---|---|---|
| 8,533,179 B2 | 9/2013 | Bendel et al. | |
| 8,799,241 B2* | 8/2014 | Barsness | G06F 17/30442 |
| | | | 707/693 |
| 8,805,802 B2* | 8/2014 | Barsness | G06F 17/30442 |
| | | | 707/693 |
| 2005/0102269 A1* | 5/2005 | Lamping | G06F 17/30595 |
| 2008/0159332 A1* | 7/2008 | Martinez | H04J 3/1682 |
| | | | 370/474 |
| 2009/0006399 A1* | 1/2009 | Raman | G06F 17/30498 |
| 2009/0043793 A1* | 2/2009 | Barsness | G06F 17/30445 |
| 2009/0254532 A1* | 10/2009 | Yang | G06F 17/30315 |
| 2010/0281079 A1* | 11/2010 | Marwah | H03M 7/30 |
| | | | 707/812 |
| 2011/0078134 A1* | 3/2011 | Bendel | G06F 17/30312 |
| | | | 707/713 |
| 2011/0219035 A1* | 9/2011 | Korsunsky | G06F 17/30 |
| | | | 707/784 |
| 2013/0191352 A1* | 7/2013 | Barsness | G06F 17/30442 |
| | | | 707/693 |
| 2013/0275473 A1* | 10/2013 | Ellison | G06F 17/30595 |
| | | | 707/802 |

OTHER PUBLICATIONS

WO 03/096230 A2, Published Nov. 2003, by WIPO.*
Abadi, Daniel J. "Integrating Compression and Execution in Column-Oriented Database Systems", SIGMOD 2006, Jun. 27-29, 2006, Chicago, Illinois, USA; 12 pgs.
Binnig et al., "Dictionary-based Order-preserving String Compression for Main Memory Coilumn Stores", SIGMOD'09, Jun. 29-Jul. 2, 2009, Providence, Rhode Island, USA, 13 pgs.

* cited by examiner

PERFORMING PREDICATE EVALUATION ON COMPRESSED CHARACTER STRING OF VARIABLE LENGTH

BACKGROUND

The present disclosure relates to a field of relational database, and in particular, to a method and device for performing predicate evaluation on compressed character string of variable length.

Recent study has shown when performing a query processing in a relational database, performance of the query processing can be greatly improved by performing predicate evaluation directly on compressed data stored in a database rather than decompressing the compressed data and then performing the predicate evaluation on decompressed data. The predicate sequentially including an argument with no function, expression or clause, an operational relation operator or a logical operator, a connection constant is usually called a simple predicate in the art, and called predicate for short. In the database language, the operational relation operators or logical operators can include "=", ">", ">=", "<", "<=", "NOT", "IN", "LIKE", "BETWEEN" or the like. Performing the predicate evaluation on data means determining whether the data satisfies the predicate, and if it does, the result of the predicate evaluation is true; otherwise the result is false.

The key for performing the predicate evaluation directly on the compressed data stored in the database is to keep order preserved in compression-encoding, that is, the order relationship of the compressed data should be consistent with that of the decompressed (original) data so as to ensure the result of the predicate evaluation correct. For example, assuming the predicate is 'age<10', the compression-encoded value 'encoded(age)' for 'age' which satisfies this predicate (for example, 1, 2, . . . , 9) should be smaller than the compression-encoded value 'encoded(10)' for the constant '10' in this predicate. These days, some compression-encoding schemes capable of well keeping the order preserved for the data types such as integer, decimal, double, fixed length character string and so on have been proposed in the art. As for the variable length character string, however, there is no favorable solution yet because there are two comparison semantics for the variable length character string in the relational database: trailing blank insensitive semantic and trailing blank sensitive semantic.

When comparing the variable length character strings in the trailing blank insensitive semantic, the character strings of different length will be compared after being padded with blank characters at lower bits to the same length, while in the trailing blank sensitive semantic, the character strings of different length will be compared directly in accordance with an alphabetical order. For example, for the following five variable length character strings represented by hexadecimal ASCII codes {x'31', x'31 18', x'31 20', x'31 20 20', x'31 32' }, in the trailing blank insensitive semantic, they will respectively correspond to {x'31 20 20', x'31 18 20', x'31 20 20', x'31 20 20', x' 31 32 20' } after being padded with blank characters at the lower bits (the ASCII code of the blank character is 20) and thus are ordered as x'31 18'<x'31'=x'31 20'=x'31 20 20'<x'31 32', while in the trailing blank sensitive semantic, these five variable length character strings will be ordered as x'31'<x'31 18'<x'31 20'<x'31 20 20'<x'31 32'. It can be seen that the variable length character strings will be ordered differently in the trailing blank insensitive semantic and the trailing blank sensitive semantic, and it is difficult to find a suitable compression-encoding manner capable of keeping the order preserved for both semantics.

An generally used existing solution for such a situation is employing a compression-encoding manner in which the order of the compression-encoded data is consistent with the order in the trailing blank sensitive semantic when performing compression-encoding on the original data. In this solution, the predicate can be evaluated directly on the compression-encoded data when performing predicate evaluation in accordance with the trailing blank sensitive semantic. However, if it is desired to perform the predicate evaluation in accordance with the trailing blank insensitive semantic, the compression-encoded data must be decompressed and then the predicate evaluation is performed on the decompressed data. It is obvious that such a solution does not support evaluating the predicate on the compression-encoded data in accordance with the trailing blank insensitive semantic and thus fails to take full advantages of the superior performance of performing the predicate evaluation directly on the compression-encoded data.

SUMMARY

In view of the above problem, the present disclosure is proposed. The object of the present disclosure is not to provide a new compression-encoding manner capable of keeping the order preserved in both the trailing blank insensitive semantic and the trailing blank sensitive semantic, but to provide a method and device which can evaluate predicate on compression-encoded variable length character string without performing decompression when performing the predicate evaluation on the variable length character string which is compression-encoded in the order consistent with that in accordance with the trailing blank sensitive semantic.

According to one embodiment of the present disclosure, there is provided a method for performing predicate evaluation on a compressed variable length character string comprising: determining upper and lower boundaries of a false positive range for a predicate, the false positive range for the predicate being a range in which a result of the predicate evaluation may lead to a false positive error; compression-encoding the upper and lower boundaries of the false positive range; performing a first comparison for comparing the compressed variable length character string with the compression-encoded upper and lower boundaries of the false positive range; and determining a result of the predicate evaluation based on at least a result of the first comparison.

According to another embodiment of the present disclosure, there is provided a device for performing predicate evaluation on a compressed variable length character string comprising: a range determination unit configured to determine upper and lower boundaries of a false positive range for a predicate, the false positive range for the predicate being a range in which a result of the predicate evaluation may lead to a false positive error; an encoding unit configured to perform a compression-encoding on the upper and lower boundaries of the false positive range; a comparison unit configured to perform a first comparison for comparing the compressed variable length character string with the compression-encoded upper and lower boundaries of the false positive range; and a result determination unit configured to determine a result of the predicate evaluation based on at least a result of the first comparison.

With the method and device according to the aspects of the present disclosure as described above, when performing, in the trailing blank insensitive semantic, a predicate evaluation on the variable length character string which is compression-encoded in the order consistent with that in the trailing blank sensitive semantic, the predicate evaluation can be performed directly on the compression-encoded variable length character string without performing decompression, which takes advantage of evaluating predicate on compressed data well, and thus improves the performance of the query processing. Moreover, with the method and device according to the aspects of the present disclosure as described above, predicate evaluation on compressed data in both semantics can be supported in a compression encoding manner in which the order is consistent with that in the trailing blank sensitive semantic, thereby enhancing the usability.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
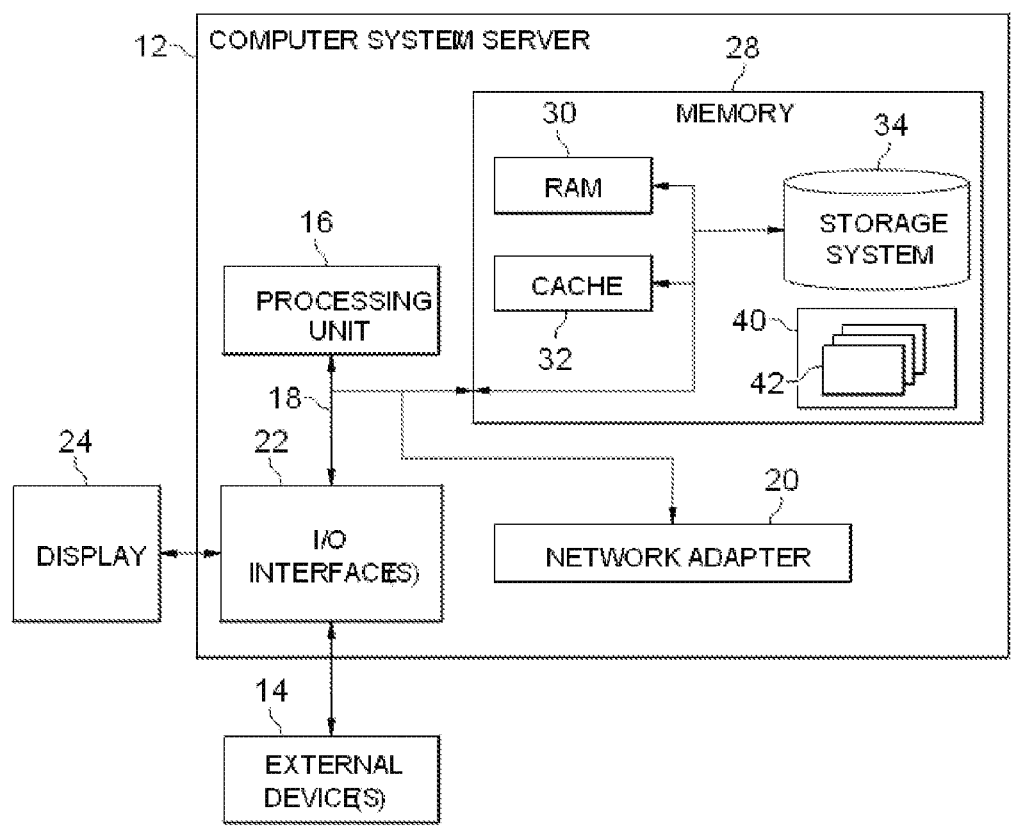
FIG. 1 shows a block diagram of an exemplary computer system/server 12 which is applicable to implement the embodiments of the present disclosure.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein. As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
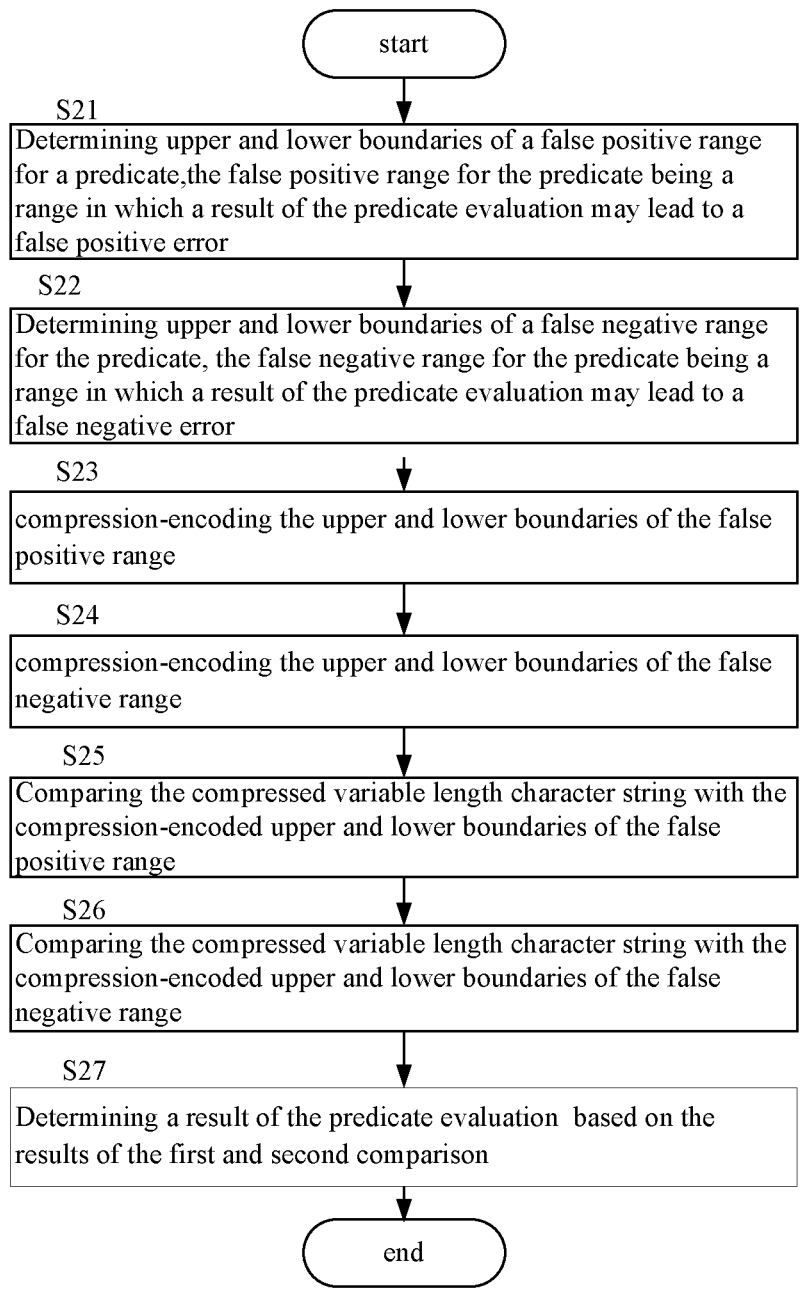
FIG. 2 shows a flow chart of a method for performing predicate evaluation on a compressed variable length character string according to a first embodiment of the present disclosure.

The method for performing predicate evaluation on a compressed variable length character string according to the first embodiment of the present disclosure will be described below with reference to FIG. 2. In this embodiment, the explanation will be given by taking an example that the compressed variable length character string is obtained by a compression-encoding manner in which the order of the compression-encoded data is consistent with the order in the trailing blank sensitive semantic and the predicate evaluation is performed in the trailing blank insensitive semantic.

As described above, the variable length character strings are ordered differently in the trailing blank insensitive semantic and the trailing blank sensitive semantic and thus it is difficult to find a suitable compression-encoding manner capable of keeping the order preserved for both semantics, however, in fact, most of the variable length character strings are ordered approximately the same in both of the semantics and only a few of special character strings may be ordered differently. Accordingly, an encoding manner capable of strictly keeping the order preserved for one semantic (for example, the trailing blank sensitive semantic) can approximately keep the order preserved for the other semantic (for example, the trailing blank insensitive semantic). That is, when performing the predicate evaluation, in accordance with the trailing blank insensitive semantic, on the variable length character strings which are compression-encoded in an order consistent with that in the trailing blank sensitive semantic, the results of the predicate evaluation for most of the compressed strings are correct, and only a small portion of strings may have incorrect results. For example, it is assumed the predicate is col>'b', col including the following seven variable length character strings of varchar (3) type {'b', 'ba', 'b␣ (assuming ␣ represents the blank character)', 'ab', 'ght', 'bΔ'(assuming Δ represents a special character which is smaller than the blank character), 'bbΔ'}. It can be understood that these seven strings are ordered as 'ab'<'bΔ'<'b'='b␣'<'ba'<'bbΔ'<'ght' in the trailing blank insensitive semantic, and the corresponding compression-encoded strings encoded in the order consistent with that in the trailing blank sensitive semantic are ordered as encoded('ab')<encoded('b')<encoded('bΔ')<encoded('b␣')<encoded('ba')<encoded('bbΔ')<encoded('ght').

It can be seen, when performing the predicate evaluation directly on the compressed strings in the trailing blank insensitive semantic, the results of the predicate evaluation for most of the compressed strings are correct and only the results for the strings 'bΔ' and 'b␣' which contain the blank character or the special characters smaller than the blank character are incorrect. To be specific, since 'bΔ'<'b' and 'b␣'='b' in the trailing blank insensitive semantic, the evaluation results thereof shall be false when performing the predicate evaluation thereon; however, since for the compression-encoded strings, encoded('bΔ')>encoded('b') and encoded('b␣')>encoded('b'), the evaluation results thereof will be determined to be true by error. In view of this, in the present embodiment, when performing the predicate evaluation in the trailing blank insensitive semantic, the predicate evaluation is performed directly on the compression-encoded variable length character strings, and the compressed variable length character strings are decompressed and the predicate evaluation is performed on the decompressed variable length character strings only if the result of the predicate evaluation is problematic, so as to obtain correct results of the predicate evaluation.

In specific, it is known in the art that the predicates such as integer predicate, decimal predicate, fixed length character predicate and so on can be rewritten into a form of a predicate range. For example, the integer predicate 'age >10' can be rewritten into 'age' in an interval range (10,+∞), and the fixed length character string predicate 'name=8' can be rewritten into 'name' in a interval range [8, 8]. In this way, in the present embodiment, the variable length character string predicate is rewritten into the form of predicate range and it is determined whether the result of the predicate evaluation performed on the compressed variable length character strings is problematic or not by using false positive error and false negative error in the statistics.

The false positive error is also called a first type error. If null hypothesis is actually tenable in hypothesis test but a result of the statistical test does not support the null hypothesis (null hypothesis denied), such an error is called the first type error. The false negative error is also called a second type error. If the null hypothesis is actually not tenable but a result of the statistical test supports the null hypothesis (null hypothesis accepted), such an error is called the second type error. For example, for an anti-virus software on a computer, if a file not being infected is reported to have being infected by the anti-virus software, it is a false positive error, which is popularly called "wrong report"; on the contrary, if a infected file is reported to have not being infected by the anti-virus software (i.e., the viruses is not detected), it is a false negative error, which is popularly called "miss report".

In exemplary embodiments, a false positive range and a false negative range are determined respectively for a variable length character string predicate, wherein the false positive range is a range in which the result of the predicate evaluation may lead to a false positive error and the false negative range is a range in which the result of the predicate evaluation may lead to a false negative error. It can be understood that the false positive range is larger than or at least equal to a correct range of the predicate and thus all the variable length strings satisfying this predicate will fall into this range (i.e., the result of the predicate evaluation for this false positive range will be true), and some variable length strings which do not satisfy this predicate may also fall into this range. The false negative range is smaller than or at most equal to the correct range of the predicate and thus all the variable length strings falling into this range (i.e. the result of the predicate evaluation for this false negative range will be true) will satisfy this predicate and some variable length strings satisfying this predicate may not fall into this range. It can be further inferred that if the evaluation results of the compressed character string in the false positive range and the false negative range are consistent with each other, that is, both true or both false, the result of the predicate evaluation is correct; while if the evaluation results of the compressed character string in the false positive range and the false negative range are inconsistent with each other, it can not be determined what the predicate evaluation result is, and the compressed variable length character string is therefore decompressed and the predicate evaluation is performed on the decompressed variable length character string.

Returning to FIG. 2, as shown in FIG. 2, at block S21, upper and lower boundaries of a false positive range for a predicate are determined, the false positive range for the predicate is a range in which a result of the predicate evaluation may lead to a false positive error; and at block S22, upper and lower boundaries of a false negative range for the predicate are determined, the false negative range for the predicate is a range in which a result of the predicate evaluation may lead to a false negative error.

As described above, the false positive error and false negative error are well-known terms in statistics. It can be understood that in the present embodiment, the false positive error refers to the error in which the result of the predication evaluation is determined to be true by error in the case that the correct result thereof should be false, and false negative error refers to the error in which the result of the predication evaluation is determined to be false by error in the case that the correct result thereof should be true. The upper and lower boundaries of the false positive range and the false negative range can be determined depending on particular predicates, and the examples thereof will be explained below.

In an example, for a predicate Col='ab' (assuming Col is of varchar(6) type), it can be understood that the predicate evaluation results for the variable length character strings such as 'ab⊔', 'ab⊔⊔' or the like which contain blank(s) at the trailing may be problematic when performing the predicate evaluation, in accordance with the trailing blank insensitive semantic, on the variable length character strings which are compression-encoded in an order consistent with that in the trailing blank sensitive semantic. Since the compression-encoded values which are obtained by encoding these character strings in the order consistent with that in the trailing blank sensitive semantic are all larger than the compression-encoded value for constant 'ab' in this predicate, the character strings such as 'ab⊔', 'ab⊔⊔' or the like may be considered as not satisfying this predicate Col='ab'. In the trailing blank insensitive semantic, however, the character strings of different length will be compared after being padded with blank characters at the lower bits and accordingly, 'ab⊔' and 'ab⊔⊔' are equal to 'ab', that is, 'ab⊔' and 'ab⊔⊔' should actually satisfy this predicate Col='ab'. Therefore the false positive range for the predicate Col='ab' can be set as ['ab', 'ab⊔⊔⊔⊔'] so that 'ab⊔', 'ab⊔⊔' or the like as described above can be included therein, and the predicate evaluation results for these character strings for the false positive range will be true. We can see that the false positive range is larger than the correct predicate range and thus all the variable length character strings satisfying the predicate will fall into this range. On the other hand, the false negative range for the predicate Col='ab' can be set as ['ab', 'ab']. As described above, the false negative range is smaller than the correct predicate range and thus some character strings such as 'ab⊔', 'ab⊔⊔' or the like which actually satisfy the predicate may be missed, but all the variable length character strings falling into this range will satisfy the predicate. The false positive ranges and the false negative ranges for other predicates can be determined in this way. For example, Table 1 shows exemplary upper and lower boundaries of the false positive ranges and of the false negative ranges determined for several common predicates when Col is of varchar(6) type.

TABLE 1

| Predicates | False Positive Ranges | False Negative Ranges |
|---|---|---|
| Col = 'ab' | ['ab', 'ab ⊔ ⊔ ⊔ ⊔'] | ['ab', 'ab'] |
| Col < 'ab' | [−∞, 'ab ⊔ ⊔ ⊔ ⊔') | [−∞, 'ab') |
| Col <= 'ab' | [−∞, 'ab ⊔ ⊔ ⊔ ⊔'] | [−∞, 'ab'] |
| Col > 'ab' | ['ab', +∞] | ('ab ⊔ ⊔ ⊔ ⊔', +∞] |
| Col >= 'ab' | ['ab', +∞] | ['ab ⊔ ⊔ ⊔ ⊔', +∞] |

The predicates listed in Table 1 are only some of the common predicates and the false positive ranges and the false negative ranges for other predicates can be determined in a similar way. For example, the false positive range and the false negative range for the predicate Col<>'ab' can be complementary sets of the false positive range and the false negative range for the predicate Col='ab' as shown in Table 1, respectively. In another example, the predicate Col BETWEEN val1 AND val2 can be split into Col>=val1 AND Col<=val2, and adopts the false positive ranges and the false negative ranges as shown in Table 1, respectively.

In addition, Table 1 shows the false positive range and the false negative ranges by taking an example that the constant contained in the predicates is a specific value 'ab', and the shown false positive ranges and false negative ranges are also suitable for the case that the constant contained in the predicates is, for example, 'bc', 'XYZ', 'X12ab' or the like. To be more specific, if padForUB(val) is used to represent a character string formed by the constant 'val' contained in the predicate padding with blank characters at the trailing to a set length for the variable length character string (for example, if Col is of varchar(6) type, it will be padded with blank characters to the length of 6), the above Table 1 can be generalized as Table 1' as following.

TABLE 1'

| Predicates | False Positive Ranges | False Negative Ranges |
|---|---|---|
| Col = val | [val, padForUB(val)] | [val, val] |
| Col < val | [−∞, padForUB(val)) | [−∞, val) |
| Col <= val | [−∞, padForUB(val)] | [−∞, val] |
| Col > val | [val, +∞] | (padForUB(val), +∞] |
| Col >= val | [val, +∞] | [padForUB(val), +∞] |

On the other hand, the false positive ranges and the false negative ranges for individual predicates shown in Table 1 are only examples, the upper and lower boundaries of the false positive range and of the false negative range can be determined by those skilled in the art depending on particular predicates and requirements (e.g., accuracy, speed or the like of the predicate evaluation) as long as it is ensured that the false positive range is larger than or at least equal to the correct predicate range so that all the variable length character strings satisfying the predicate will fall into this range and the false negative range is smaller than or at most equal to the correct predicate range so that all the variable length strings falling into this range will satisfy the predicate. For example, with respect to the predicates Col='ab', Col<'ab' and Col<='ab' in Table 1, the upper boundary of the false positive ranges thereof can be expanded to 'ab!', 'ab#', 'ab*' or the like (the ASCII codes of characters '!', '#', '*' are all larger than the ASCII code of the blank character) or even further expanded to 'aba', 'ac', +∞ or the like. In an another example, with respect to the predicates Col>'ab' and Col>='ab', the lower boundary of the false negative ranges thereof can be narrowed to 'ab!', 'ab#', 'ab*' or the like or even further narrowed to 'aba', 'ac', +∞ or the like, and the lower boundary of the false positive ranges thereof can be expanded to 'aa', 'aZ', −∞ or the like.

In another example, for a predicate Col>'abΔa⊔' (assuming Col is of varchar(6) type), it can be understood that the predicate evaluation results for the variable length character strings such as 'ab' may be problematic when performing the predicate evaluation, in accordance with the trailing blank insensitive semantic, on the variable length character strings which are compression-encoded in an order consistent with that in the trailing blank sensitive semantic. Since the compression-encoded values which are obtained by encoding these character strings in the order consistent with that in the trailing blank sensitive semantic are smaller than the compression-encoded value for constant 'abΔa⊔' in the predicate, the character strings 'ab' may be considered as not satisfying the predicate Col>'abΔa⎵'. In the trailing blank insensitive semantic, however, the character strings of different length will be compared after being padded with blank characters at the lower bits and accordingly, 'ab' is larger than 'abΔa⎵', that is, 'ab' should actually satisfy the predicate Col>'abΔa⎵'. Therefore the false positive range for the predicate Col>'abΔa⎵' can be set up to ['ab', +∞] so that 'ab' described above can be included therein and the predicate evaluation result for this character string for the false positive range will be true. We can see that the false positive range is larger than the correct predicate range and thus all the variable length character strings satisfying the predicate will fall into this range. On the other hand, the false negative range for the predicate Col>'abΔa⎵' can be set up to ('abΔa⎵ ⎵', +∞]. As described above, the false negative range is smaller than the correct predicate range and thus some character strings which actually satisfy the predicate may be missed, but all the variable length character strings falling into this range will satisfy the predicate. The false positive ranges and the false negative ranges for other predicates can be determined in this way. For example, Table 2 shows exemplary upper and lower boundaries of the false positive ranges and of the false negative ranges determined for several common predicates when Col is of varchar (6) type.

TABLE 2

| Predicates | False Positive Ranges | False Negative Ranges |
| --- | --- | --- |
| Col = 'abΔa ⎵' | ['ab', 'abΔa ⎵ ⎵'] | ['abΔa ⎵', 'abΔa ⎵'] |
| Col < 'abΔa ⎵' | [-∞, 'abΔa ⎵ ⎵') | [-∞, 'ab') |
| Col <= 'abΔa ⎵' | [-∞, 'abΔa ⎵ ⎵'] | [-∞, 'ab'] |
| Col > 'abΔa ⎵' | ['ab', +∞] | ('abΔa ⎵ ⎵', +∞] |
| Col >= 'abΔa ⎵' | ['ab', +∞] | ['abΔa ⎵ ⎵', +∞] |

The predicates listed in Table 2 are only some of the common predicates and the false positive ranges and the false negative ranges for other predicates can be determined in a similar way. For example, the false positive range and the false negative range for the predicate Col< >'abΔa⎵' can be complementary sets of the false positive range and the false negative range for the predicate Col='abΔa⎵' as shown in Table 2, respectively. In another example, the predicate Col BETWEEN val1 AND val2 can be split into Col>=val1 AND Col<=val2, and adopts the false positive ranges and the false negative ranges as shown in Table 2, respectively.

In addition, Table 2 shows the false positive range and the false negative ranges by taking an example that the constant contained in the predicates is a specific value 'abΔa⎵', and the shown false positive ranges and false negative ranges are also suitable for the case that the constant contained in the predicates is, for example, 'bcΔa', 'XYZΔa⎵', 'X1aΔa' or the like. To be more specific, if stripForUB(val) is used to represent a character string from a most significant character to one character before a first character which is smaller than the blank character contained in the constant string 'val' of the predicate and padForUB(val) is used to represent a character string formed by the constant 'val' contained in the predicate padding with blank characters at the trailing to a set length for the variable length character string (for example, if Col is of varchar(6) type, it will be padded with the blank characters to the length of 6), the above Table 2 can be generalized as Table 2' as following.

TABLE 2'

| Predicates | False Positive Ranges | False Negative Ranges |
| --- | --- | --- |
| Col = val | [stripForLB(val), padForUB(val)] | [val, val] |
| Col < val | -∞, padForUB(val)) | [-∞, stripForLB(val)) |
| Col <= val | -∞, padForUB(val)] | [-∞, stripForLB(val)] |
| Col > val | [stripForLB(val), +∞] | (padForUB(val), +∞] |
| Col >= val | [stripForLB(val), +∞] | [padForUB(val), +∞] |

On the other hand, similar to Table 1, the false positive ranges and the false negative ranges for individual predicates shown in Table 2 are only examples and the upper and lower boundaries of the false positive range and of the false negative range can be determined by those skilled in the art depending on particular predicates and requirements (e.g., accuracy, speed or the like of the predicate evaluation) as long as it is ensured that the false positive range is larger than or at least equal to the correct predicate range so that all the variable length character strings satisfying the predicate will fall into this range and the false negative range is smaller than or at most equal to the correct predicate range so that all the variable length strings falling into this range will satisfy the predicate. For example, with respect to the predicates Col>'abΔa⎵' and Col>='abΔa⎵', the lower boundary of the false negative ranges thereof can be narrowed to 'abΔa!', 'abΔa#', 'abΔa*' or the like or even further narrowed to 'abΔaa', 'ac', +∞ or the like. In an another example, with respect to the predicate Col='abΔa ⎵', the lower boundary of the false positive ranges thereof can be setup to 'abΔ', 'abΔa' or the like, and the upper boundary thereof can be expanded to 'abΔa⎵!', 'abΔa⎵#', 'abΔa⎵*' or the like (the ASCII codes of the characters '!', '#' and '*' are all larger than the ASCII code of the blank character) or even further expanded to 'abΔaa', 'ac', +∞ or the like.

It has described above by way of example how to determine the upper and lower boundaries of the false positive ranges and the false negative ranges. As described above, the false positive ranges and the false negative ranges listed in Tables 1' and 2' are only examples, the upper and lower boundaries of the false positive range and of the false negative range can be determined by those skilled in the art depending on particular predicates and the requirements of, for example, accuracy, speed or the like of the predicate evaluation. For example, in order to realize a predicate evaluation of high speed, the false positive range should be as small as possible in the precondition that all the character strings satisfying the predicate are ensured to fall into this false positive range, and the false negative range should be as large as possible in the precondition that all the character strings falling into this false positive range are ensured to satisfy the predicate.

Returning back to FIG. 2, at block S23, the upper and lower boundaries of the false positive range are compression-encoded. In exemplary embodiments, the upper and lower boundaries of the false positive range are encoded by using an encoding method which is employed in encoding the variable length character strings. For example, assuming the predicate is col>'abc' and the upper and lower boundaries of the false positive range thereof is +∞ and 'abc', respectively, the upper and lower boundaries of the false positive range after being compression-encoded are encoded (+∞) and encoded('abc'), respectively.

At block S24, the upper and lower boundaries of the false negative range are compression-encoded. In exemplary embodiments, the upper and lower boundaries of the false negative range are compression-encoded also by using the encoding method which is employed in encoding the variable length character strings. For example, assuming the upper and lower boundaries of the false negative range is +∞ and 'abc␣␣', respectively, the upper and lower boundaries of the false negative range after being compression-encoded are encoded(+∞) and encoded('abc␣␣'), respectively.

At block S25, the compressed variable length character string is compared with the upper and lower boundaries of the false positive range which have been compression-encoded. In exemplary embodiments, it is determined whether the compressed variable length character string falls into a range defined by the compression-encoded upper and lower boundaries of the false positive range (simply referred to as "compression-encoded false positive range") or not by comparing the compressed variable length character string with the compression-encoded upper and lower boundaries of the false positive range. For example, assuming the compressed variable length character string is encoded ('abca'), it is compared with the compression-encoded upper and lower boundaries encoded(+∞) and encoded encoded ('abc') described as an example in block S23 so as to determine whether encoded('abca') is within the compression-encoded false positive range [encoded(+∞), encoded ('abc')].

At block S26, the compressed variable length character string is compared with the upper and lower boundaries of the false negative range which have been compression-encoded. In exemplary embodiments, it is determined whether the compressed variable length character string falls into a range defined by the compression-encoded upper and lower boundaries of the false negative range (simply referred to as "compression-encoded false negative range") or not by comparing the compressed variable length character string with the compression-encoded upper and lower boundaries of the false negative range. For example, the compressed variable length character string encoded('abca') is compared with the compression-encoded upper and lower boundaries encoded(+∞) and encoded('abc␣␣') described as an example in block S24 so as to determine whether encoded('abca') is within the compression-encoded false negative range [encoded(+∞), encoded('abc␣␣')] or not.

As shown at block S27, a result of the predicate evaluation is determined based on the results of the first and second comparison. In exemplary embodiments, the result of the predicate evaluation is determined based on whether the compressed variable length character string falls into the compression-encoded false positive range and the compression-encoded false negative range. This process will be described below with reference to FIG. 3.

Figure 3:
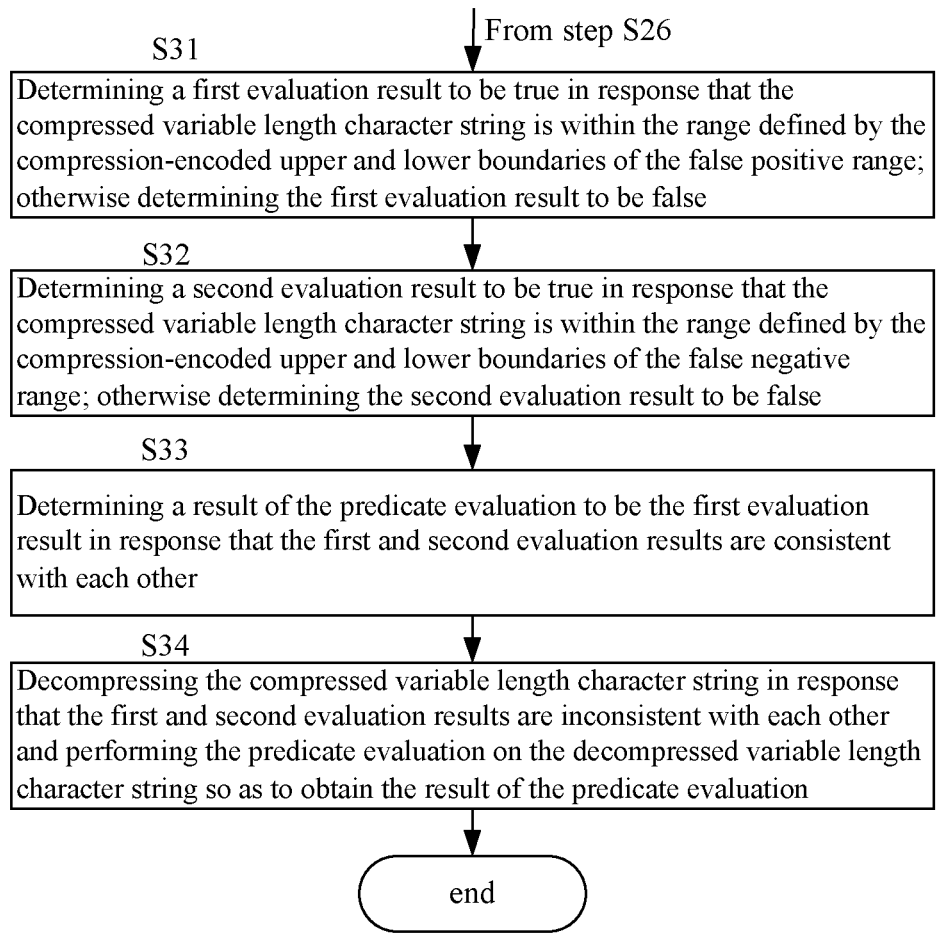
FIG. 3 shows a flow chart of a processing for determining a result of the predicate evaluation based on a result of a first comparison and a result of a second comparison in the method according to the first embodiment of the present disclosure.

As shown in FIG. 3, at block S31, a first evaluation result is determined to be true in response that the compressed variable length character string is within the range defined by the compression-encoded upper and lower boundaries of the false positive range; otherwise the first evaluation result is determined to be false. For example, with respect to the example described in the above block S25, since the compressed variable length character string encoded('abca') is within the compression-encoded false positive range [encoded(+∞), encoded('abc')], the first evaluation result is determined to be true.

At block S32, a second evaluation result is determined to be true in response that the compressed variable length character string is within the range defined by the compression-encoded upper and lower boundaries of the false negative range; otherwise the second evaluation result is determined to be false. For example, with respect to the example shown in the above block S26, since the compressed variable length character string encoded('abca') is within the compression-encoded false negative range [encoded(+∞), encoded('abc␣␣')], the second evaluation result is determined to be true.

As shown at block S33, a result of the predicate evaluation is determined to be the first evaluation result in response that the first and second evaluation results are consistent with each other. As described above, if the evaluation results for the compressed character string in the false positive range and the false negative range are consistent with each other, that is, both true or both false, the result of the predicate evaluation is correct. For example, with respect to the example shown in blocks S31 and S32, the first and second evaluation results are both true, that is, the evaluation results for the compressed variable length character string encoded('abca') in the false positive range and the false negative range are consistent with each other, i.e., both true. Then it can be determined that the result of the predicate evaluation on the compressed variable length character string encoded('abca') is true, that is, consistent with the first evaluation result (and certainly consistent with the second evaluation result).

In exemplary embodiments, the method for performing the predicate evaluation on the compressed variable length character string according to the embodiment can further include block S34 in which the compressed variable length character string is decompressed in response that the first and second evaluation results are inconsistent with each other, and the predicate evaluation is performed on the decompressed variable length character string so as to obtain the result of the predicate evaluation.

As described above, if the evaluation results for the compressed character string in the false positive range and the false negative range are inconsistent with each other, it cannot be determined what the result of the predicate evaluation is. Thus the compressed variable length character string is decompressed and the predicate evaluation is performed on the decompressed variable length character string in the trailing blank insensitive semantic by using a conventional method known in the art so as to obtain the result of the predicate evaluation.

To facilitate understanding, the method for performing the predicate evaluation on the compressed variable length character string according to the embodiment is explained below in combination with specific examples.

It is assumed that the predicate is Col>'ab wherein 'Col' is of varchar(6) type. Assuming the examples shown in Table 1 are employed in blocks S21 and S22, and the upper and lower boundaries of the false positive range of said predicate are determined to be +∞ and 'ab', respectively, and the upper and lower boundaries of the false negative range are determined to be +∞ and 'ab␣␣␣␣', respectively. Subsequently, the upper and lower boundaries of the false positive range are encoded to obtain the compression-encoded upper and lower boundaries of the false positive range encoded(+∞) and encoded('ab') in block S23, and the upper and lower boundaries of the false negative range are encoded to obtain the compression-encoded upper and lower boundaries of the false negative range encoded(+∞) and encoded('ab␣␣␣␣') in block S24.

In an example, it is assumed that the compressed variable length character string is encoded('abc'). In this case, this string is compared with the compression-encoded upper and lower boundaries of the false positive range encoded(+∞) and encoded('ab') and it is determined that encoded('abc')

is within the range of [encoded(+∞), encoded('ab')] in block S25. Similarly, as shown at block S26, the string is compared with the compression-encoded upper and lower boundaries of the false negative range encoded(+∞) and encoded('ab␣ ␣␣␣ ') and it is determined that encoded ('abc') is within the range of [encoded(+∞), encoded('ab ␣␣␣␣ ')]. As shown at block S27, the first evaluation result is determined to be true based on the comparison result in block S25 and the second evaluation result is also determined to be true based on the comparison result in block S26. Since the first and second evaluation results are consistent with each other, that is, both true, the predicate evaluation result of 'abc' can be determined to be true.

In another example, it is assumed that the compressed variable length character string is encoded('aa'). In this case, this string is compared with the compression-encoded upper and lower boundaries of the false positive range encoded(+∞) and encoded('ab') and it is determined that encoded('aa') is not within the range of [encoded(+∞), encoded('ab')] in block S25. Similarly, in block S26, the string is compared with the compression-encoded upper and lower boundaries of the false negative range encoded(+∞) and encoded('ab ␣␣␣␣ ') and it is determined that encoded('aa') is not within the range of [encoded(+∞), encoded('ab ␣␣␣␣ ')]. As shown at block S27, the first evaluation result is determined to be false based on the comparison result in block S25 and the second evaluation result is determined to be false based on the comparison result in block S26. Since the first and second evaluation results are consistent with each other, that is, both false, the predicate evaluation result of 'abc' can be determined to be false.

In yet another example, it is assumed that the compressed variable length character string is encoded('abΔ'). In this case, this string is compared with the compression-encoded upper and lower boundaries of the false positive range encoded(+∞) and encoded('ab') and it is determined that encoded('abΔ') is within the range of [encoded(+∞), encoded('ab')] in block S25. As shown at block S26, the string is compared with the upper and lower boundaries of the false negative range encoded(+∞) and encoded('ab␣ ␣␣␣ ') and it is determined that encoded('abΔ') is not within the range of [encoded(+∞), encoded('ab␣ ␣␣␣ ')]. As shown at block S27, the first evaluation result is determined to be true based on the comparison result in block S25 and the second evaluation result is determined to be false based on the comparison result in block S26. Since the first and second evaluation results are inconsistent with each other, in block S27, the compressed variable length character string encoded('abΔ') is decompressed to obtain the decompressed variable length character string 'abΔ', and it is determined through a conventional method for the predicate evaluation in the art that 'abΔ' does not satisfy Col>'ab' in the trailing blank insensitive semantic, thereby the result of the predicate evaluation is determined to be false.

It is to be noted that although the method for performing the predicate evaluation on the compressed variable length character string according to the embodiment is explained above in the order from block S21 to block S27, it is only an example and blocks S21 to S27 are not necessarily to be performed in the order as described. For example, blocks S21, S23 and S25 can be performed sequentially followed by sequentially performed blocks S22, S24 and S26, or blocks S21, S23 and S25 can be performed concurrently with blocks S22, S24 and S26, or the like.

A description of the method for performing the predicate evaluation on the compressed variable length character string according to the first embodiment has been made above. In this embodiment, when performing, in the trailing blank insensitive semantic, the predicate evaluation on the variable length character string which is compression-encoded in the order consistent with that in the trailing blank sensitive semantic, the predicate evaluation is performed directly on compression-encoded variable length character string by using the false positive range and the false negative range of the predicate without performing decompression, and only if the result of the predicate evaluation is problematic, the compressed variable length character string is decompressed and the predicate evaluation is performed on the decompressed variable length character strings, so as to obtain a correct predicate evaluation result. This embodiment takes full advantage of evaluating predicate on compressed data, and thereby improving the performance of a query processing.

In the method for performing the predicate evaluation on the compressed variable length character string according to the first embodiment, a false positive range and a false negative range are determined for a variable length character string, and the predicate evaluation result is then determined based on whether the compressed variable length character string falls into the compression-encoded false positive range and false negative range or not. In fact, however, it is not necessary to determine the false negative range and to determine whether the compressed variable length character string falls into the compression-encoded false negative range or not (that is the processing in blocks S22, S24 and S26) in many cases. This will be illustrated by way of examples in the following.

For example, from the above description, the false positive range is larger than the false negative range, and thus if the compressed variable length character string is out of the compression-encoded false positive range, it will certainly be out of the compression-encoded false negative range, either. In this case, there is no need to determine the false negative range or determine whether the compressed variable length character string falls into the compression-encoded false negative range or not any more.

In another example, if the compression-encoded values of the upper and lower boundaries of the false negative range are equal to those of the false positive range, respectively, there is no need to determine whether the compressed variable length character string falls into the compression-encoded false negative range or not any more.

In yet another example, for an intermediate predicate generated by, for example, foreign key relationship in the query, since other query processing is still to be performed after the intermediate predicate is performed, the evaluation result for this intermediate predicate needs not to be so accurate. As the false positive range is larger than or equal to the correct predicate range and thus all the character strings satisfying the predicate will fall into this range, the predicate can be evaluated by using only the false positive range and the character strings which actually do not satisfy the predicate may be further filtered out in other subsequent query processing. In fact, it can be understood that, in addition to the case that the intermediate predicate is generated by foreign key relationship in the query, the predicate can be evaluated by using only the false positive range in the cases that the accuracy of the predicate evaluation result is not required to be high.

Figure 4:
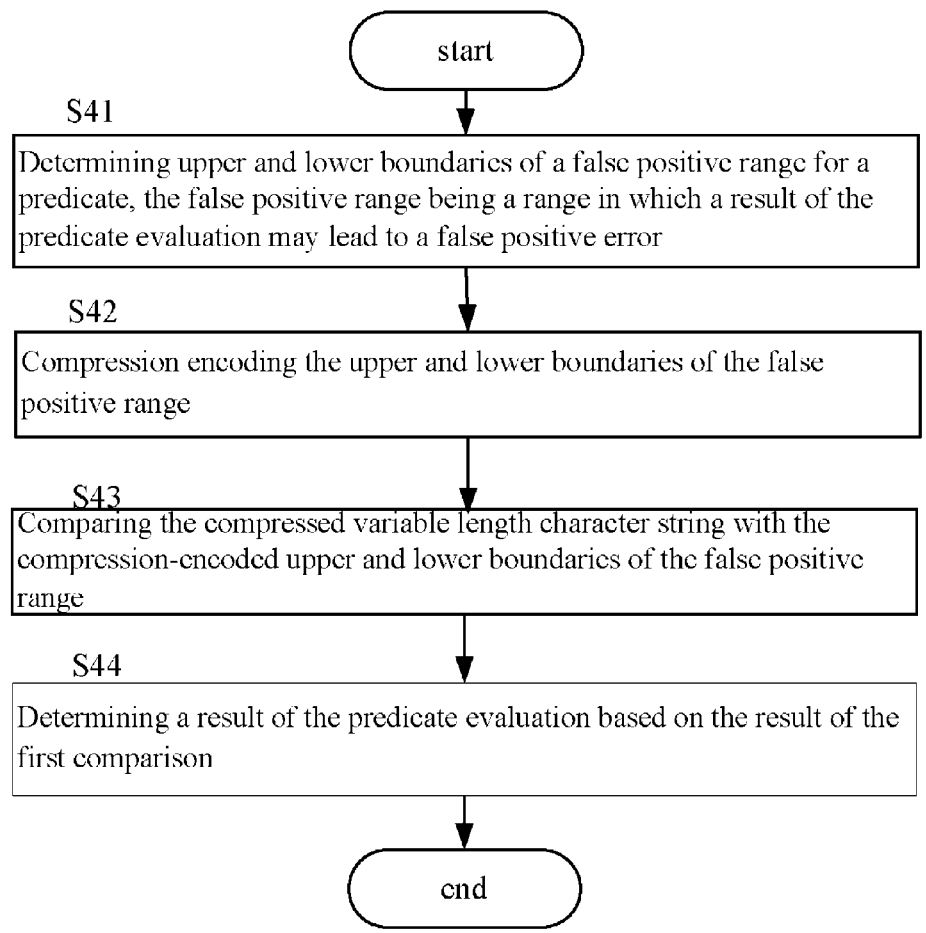
FIG. 4 shows a flow chart of a method for performing predicate evaluation on a compressed variable length character string according to a second embodiment of the present disclosure.

In the method for performing the predicate evaluation on the compressed variable length character string according to this embodiment, only the false positive range is determined and the false negative range is not, and the result of the predicate evaluation is determined based on whether the compressed variable length character string falls into the compression-encoded false positive range or not. FIG. 4 shows a flow chart of the method performing a predicate evaluation on the compressed variable length character string according to this embodiment. The description will be given below with reference to FIG. 4.

As shown in FIG. 4, at block S41, upper and lower boundaries of a false positive range for a predicate is determined, the false positive range being a range in which a result of the predicate evaluation may lead to a false positive error. In exemplary embodiments, the false positive ranges as shown in Tables 1' and 2' described in the first embodiment can be employed similarly. Of course, the false positive ranges shown in Tables 1' and 2' are only illustrative but not limitative. The upper and lower boundaries of the false positive range can be determined by those skilled in the art depending on the particular predicates and particular requirements such as accuracy and speed of the predicate evaluation, and so on. For example, it is understand that in order to realize a high speed of the predicate evaluation, the false positive range should be as small as possible in the precondition that all the character strings satisfying the predicate are ensured to fall into this false positive range.

As shown at block S42, the upper and lower boundaries of the false positive range are compression-encoded. In exemplary embodiments, the upper and lower boundaries of the false positive range are encoded by using an encoding method which is employed in encoding the variable length character strings. For example, assuming the predicate is col>'abc' and the upper and lower boundaries of the false positive range thereof is +∞ and 'abc', respectively, the upper and lower boundaries of the false positive range after being compression-encoded are encoded(+∞) and encoded ('abc'), respectively.

As shown at block S43, the compressed variable length character string is compared with the upper and lower boundaries of the false positive range which have been compression-encoded. In exemplary embodiments, it is determined whether the compressed variable length character string falls into a range defined by the compression-encoded upper and lower boundaries of the false positive range or not by comparing the compressed variable length character string with the compression-encoded upper and lower boundaries of the false positive range. For example, assuming the compressed variable length character string is encoded('abca'), it is compared with the compression-encoded upper and lower boundaries encoded(+∞) and encoded encoded('abc') described as an example in block S42, so as to determine whether or not encoded('abca') is within the compression-encoded false positive range [encoded(+∞), encoded('abc')].

As shown at block S44, a result of the predicate evaluation is determined based on the result of the first comparison. In specific, if the result of the first comparison indicates the compressed variable length character string falls into the compression-encoded false positive range, the result of the predicate evaluation is determined to be true; otherwise it is determined to be false. For example, in the example shown in the above block S43, the result of the predicate evaluation is determined to be true because the compressed variable length character string encoded('abca') is within the compression-encoded false positive range [encoded(+∞), encoded('abc')].

A description of the method for performing the predicate evaluation on the compressed variable length character string according to the second embodiment has been given above. In this embodiment, when performing, in the trailing blank insensitive semantic, the predicate evaluation on the variable length character string which is compression-encoded in the order consistent with that in the trailing blank sensitive semantic, the predicate evaluation is performed directly on compression-encoded variable length character string by using the false positive range of the predicate without decompression. This embodiment takes full advantage of evaluating predicate on compressed data, improving the performance of a query processing. Furthermore, the predicate evaluation is performed by using only the false positive range in this embodiment, and thus it is not necessary to determine the false negative range or to perform the operation related to the false negative range, which further improves the speed of the query processing as compared with the first embodiment.

Figure 5:
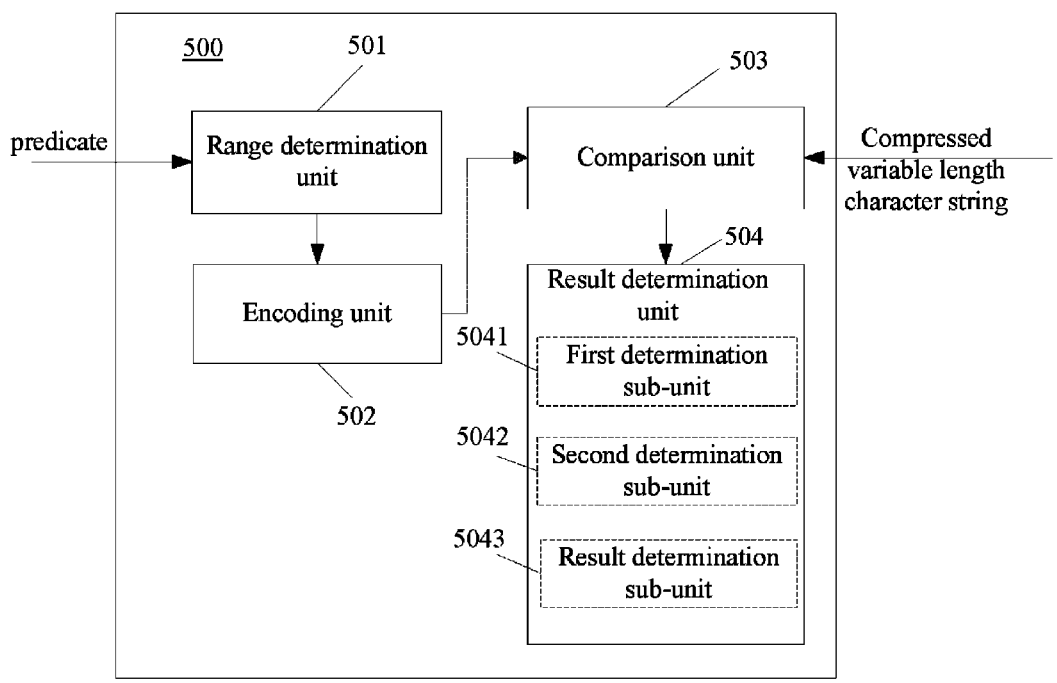
FIG. 5 shows a structural block diagram of a device for performing predicate evaluation on a compressed variable length character string according to an embodiment of the present disclosure.

A structural block diagram of a computing device for performing predicate evaluation on compressed variable length character strings according to the embodiment is described with reference to FIG. 5. In specific, the explanation will be given by taking an example that the compressed variable length character string is obtained by a compression-encoding manner in which the order of the compression-encoded data is consistent with the order in the trailing blank sensitive semantic and the predicate evaluation is performed in the trailing blank insensitive semantic.

The computing device 500 for performing the predicate evaluation according to this embodiment can perform the methods for performing the predicate evaluation on the compressed variable length character string as described in the above embodiments. In exemplary embodiments, the computing device 500 for performing the predicate evaluation includes a processor that includes a range determination unit 501, an encoding unit 502, a comparison unit 503 and a result determination unit 504.

The range determination unit 501 determines upper and lower boundaries of a false positive range for a predicate, the false positive range being a range in which a result of the predicate evaluation may lead to a false positive error. As described above, the false positive error is an error which determines the result of the predicate evaluation to be true by error in the case that the correct result should be false. In specific, the range determination unit 501 can similarly employ the exemplary false positive ranges as shown in Tables 1' and 2' given in the first embodiment, for example. Of course, the false positive ranges shown in Tables 1' and 2' are only illustrative but not limitative. The upper and lower boundaries of the false positive range can be determined by using the range determination unit 501 by those skilled in the art depending on the particular predicates and particular requirements such as accuracy and speed of the predicate evaluation and so on. For example, it is understood that in order to realize a high speed of the predicate evaluation, the false positive range should be as small as possible in the precondition that all the character strings satisfying the predicate are ensured to fall into this false positive range.

The encoding unit 502 compression-encodes the upper and lower boundaries of the false positive range. In specific, the encoding unit 502 compression-encodes the upper and lower boundaries of the false positive range obtained by the range determination unit 501 by using an encoding method which is employed in encoding the variable length character strings.

The comparison unit 503 compares the compressed variable length character string with the upper and lower boundaries of the false positive range which have been compression-encoded. In specific, the comparison unit 503 determines whether the compressed variable length character string falls into the compression-encoded false positive range or not by comparing the compressed variable length character string with the compression-encoded upper and lower boundaries of the false positive range obtained by the encoding unit 502.

The result determination unit 504 determines the result of the predicate evaluation based on the result of the first comparison. In specific, if the result of the first comparison determined by the comparison unit 503 indicates the compressed variable length character string falls into the compression-encoded false positive range, result determination unit 504 determines the result of the predicate evaluation to be true; otherwise it determines the result to be false.

In exemplary embodiments, the range determination unit 501 can further determine upper and lower boundaries of a false negative range, the false negative range being a range in which a result of the predicate evaluation may lead to a false negative error. As described above, the false negative error is an error which determines the result of the predicate evaluation to be false by error in the case that the correct result should be true. In specific, the range determination unit 501 can similarly employ the exemplary false negative ranges as shown in Tables 1' and 2' given in the first embodiment, for example. Of course, the false negative ranges shown in Tables 1' and 2' are only illustrative but not limitative. The upper and lower boundaries of the false negative range can be determined by using the range determination unit 501 by those skilled in the art depending on the particular predicates and particular requirements such as accuracy and speed of the predicate evaluation and so on.

In exemplary embodiments, the encoding unit 502 can further compression-encode the upper and lower boundaries of the false negative range. In specific, the encoding unit 502 compression-encodes the upper and lower boundaries of the false negative range obtained by the range determination unit 501 by using an encoding method which is employed in encoding the variable length character strings.

In exemplary embodiments, the comparison unit 503 can further compare the compressed variable length character string with the upper and lower boundaries of the false negative range which have been compression-encoded. In specific, the comparison unit 503 determines whether the compressed variable length character string falls into the compression-encoded false negative range or not by comparing the compressed variable length character string with the compression-encoded upper and lower boundaries of the false negative range obtained by the encoding unit 502.

In exemplary embodiments, the result determination unit 504 can also determine the result of the predicate evaluation based on the results of the first and second comparison. As shown in FIG. 5, the result determination unit 504 can further include a first determination sub-unit 5041, a second determination sub-unit 5042 and a result determination sub-unit 5043. In specific, the first determination sub-unit 5041 determines a result of a first evaluation based on the comparison result of the comparison unit 503. That is, if it is determined by the comparison unit 503 that the compressed variable length character string falls into a range defined by the compression-encoded upper and lower boundaries of the false positive range, the first determination sub-unit 5041 determines the result of the first evaluation to be true; otherwise it determines the result to be false. The second determination sub-unit 5042 determines a result of a second evaluation based on the comparison result obtained by the comparison unit 503 in the same way. That is, if it is determined by the comparison unit 503 that the compressed variable length character string falls into a range defined by the compression-encoded upper and lower boundaries of the false negative range, the second determination sub-unit 5042 determines the result of the second evaluation to be true; otherwise it determines the result to be false. The result determination sub-unit 5043 determines the result of the predicate evaluation based on the results of the first and second evaluation. In specific, if the results of the first and second evaluation are consistent with each other, the result determination sub-unit 5043 determines the result of the predicate evaluation is the result of the first evaluation; and if the results of the first and second evaluation are inconsistent with each other, the result determination sub-unit 5043 decompresses the compressed variable length character string and performs a conventional predicate evaluation on the decompressed variable length character string so as to obtain the result of the predicate evaluation.

A description of the device for performing the predicate evaluation on the compressed variable length character string according to the embodiment has been given above. In this embodiment, when performing, in the trailing blank insensitive semantic, the predicate evaluation on the variable length character string which is compression-encoded in the order consistent with that in the trailing blank sensitive semantic, the predicate evaluation is performed directly on compression-encoded variable length character strings by using the false positive range (and the false negative range) of the predicate without performing decompression. This embodiment takes full advantage of evaluating predicate on compressed data well, and thereby improving the performance of querying process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for performing predicate evaluation on a compressed variable length character string comprising:
   determining, by a processor, upper and lower boundaries of a false positive range for a predicate, the false positive range for the predicate being a range in which a result of the predicate evaluation leads to a false positive error;
   compression-encoding, by the processor, the upper and lower boundaries of the false positive range;
   performing, by the processor, a first comparison for comparing the compressed variable length character string with the compression-encoded upper and lower boundaries of the false positive range;
   determining, by the processor, a result of the predicate evaluation based on at least a result of the first comparison;
   determining, by the processor, upper and lower boundaries of a false negative range for the predicate, the false negative range for the predicate being a range in which a result of the predicate evaluation leads to a false negative error;
   compression-encoding, by the processor, the upper and lower boundaries of the false negative range; and
   performing, by the processor, a second comparison for comparing the compressed variable length character string with the compression-encoded upper and lower boundaries of the false negative range, wherein determining the result of the predicate evaluation based on at least the result of the first comparison comprises determining the result of the predicate evaluation based on the result of the first comparison and a result of the second comparison, said determining the result of the predicate evaluation based on the result of the first comparison and the result of the second comparison further comprises:

determining, by the processor, a first evaluation result to be true in response that the compressed variable length character string is within a range defined by the compression-encoded upper and lower boundaries of the false positive range, and otherwise determining the first evaluation result to be false;

determining, by the processor, a second evaluation result to be true in response that the compressed variable length character string is within a range defined by the compression-encoded upper and lower boundaries of the false negative range, and otherwise determining the second evaluation result to be false;

determining, by the processor, the result of the predicate evaluation to be the first evaluation result in response that the first evaluation result is consistent with the second evaluation result; and decompressing, in response that the first evaluation result is inconsistent with the second evaluation result, the compressed variable length character string and performing the predicate evaluation on the decompressed variable length character string to obtain the result of the predicate evaluation.

2. The computer-implemented method for performing predicate evaluation according to claim 1, wherein determining the result of the predicate evaluation based on at least the result of the first comparison further comprises:

determining, by the processor, the result of the predicate evaluation to be true in response that the compressed variable length character string is within a range defined by the compression-encoded upper and lower boundaries of the false positive range.

3. The computer-implemented method for performing predicate evaluation according to claim 1, wherein the false positive error is an error which determines the result of the predicate evaluation to be true by error in the case that a correct result is false, and said false negative error is an error which determines the result of the predicate evaluation to be false by error in the case that a correct result is true.

4. The computer-implemented method for performing predicate evaluation according to claim 1, wherein the predicate evaluation is performed in trailing blank insensitive semantic.

5. The computer-implemented method for performing predicate evaluation according to claim 4, wherein in a case that the predicate contains a equal sign operator, the lower boundary of the false positive range is a character string from a most significant character to one character before a first character which is smaller than a blank character contained in a constant string of the predicate, and the upper boundary is a character string formed by padding the constant string with blank characters after a least significant character to a set length for the variable length character string; and the upper and lower boundaries of the false negative range are the constant string.

6. The computer-implemented method for performing predicate evaluation according to claim 4, wherein in a case that the predicate contains a greater than sign operator, the lower boundary of the false positive range is a character string from a most significant character to one character before a first character which is smaller than a blank character contained in a constant string of the predicate, and the upper boundary is positive infinite; the lower boundary of the false negative range is a character string formed by padding the constant string with blank characters after a least significant character to a set length for the variable length character string, and the upper boundary is positive infinite.

7. The computer-implemented method for performing predicate evaluation according to claim 4, wherein in a case that the predicate contains a smaller than sign operator, the lower boundary of the false positive range is negative infinite, and the upper boundary is a character string formed by padding a constant string of the predicate with blank characters after a least significant character to a set length for the variable length character string; the lower boundary of the false negative range is negative infinite, and the upper boundary is a character string from a most significant character to one character before a first character which is smaller than a blank character contained in the constant string.

8. The computer-implemented method for performing predicate evaluation according to claim 1, wherein the compressed variable length character string is obtained by using a compression-encoding manner in which an order of the compression-encoded data is consistent with an order in the trailing blank sensitive semantic.

9. A computing device having a processor for performing predicate evaluation on a compressed variable length character string, the processor is configured to:

determine upper and lower boundaries of a false positive range for a predicate, the false positive range for the predicate being a range in which a result of the predicate evaluation leads to a false positive error;

perform a compression-encoding on the upper and lower boundaries of the false positive range;

perform a first comparison for comparing the compressed variable length character string with the compression-encoded upper and lower boundaries of the false positive range;

determine a result of the predicate evaluation based on at least a result of the first comparison;

determine upper and lower boundaries of a false negative range for the predicate, the false negative range for the predicate being a range in which a result of the predicate evaluation leads to a false negative error;

compression-encode the upper and lower boundaries of the false negative range; and perform a second comparison for comparing the compressed variable length character string with the compression-encoded upper and lower boundaries of the false negative range, wherein determining the result of the predicate evaluation based on at least the result of the first comparison comprises determining the result of the predicate evaluation based on the result of the first comparison and a result of the second comparison, said determining the result of the predicate evaluation based on the result of the first comparison and the result of the second comparison further comprises:

determining a first evaluation result to be true in response that the compressed variable length character string is within a range defined by the compression-encoded upper and lower boundaries of the false positive range, and otherwise determining the first evaluation result to be false;

determining a second evaluation result to be true in response that the compressed variable length character string is within a range defined by the compression-encoded upper and lower boundaries of the false negative range, and otherwise determining the second evaluation result to be false;

determining the result of the predicate evaluation to be the first evaluation result in response that the first evaluation result is consistent with the second evaluation result; and decompressing, in response that the first evaluation result is inconsistent with the second evaluation result, the compressed variable length character string and performing the predicate evaluation on the decompressed variable length character string to obtain the result of the predicate evaluation.

10. The computing device for performing predicate evaluation according to claim 9, wherein determining the result of the predicate evaluation based on at least the result of the first comparison includes determining the result of the predicate evaluation to be true in response that the compressed variable length character string is within a range defined by the compression-encoded upper and lower boundaries of the false positive range.

11. The computing device for performing predicate evaluation according to claim 9, said false positive error is an error which determines the result of the predicate evaluation to be true by error in the case that a correct result is false, and said false negative error is an error which determines the result of the predicate evaluation to be false by error in a case that a correct result is true.

12. The computing device for performing predicate evaluation according to claim 9, wherein the predicate evaluation is performed in trailing blank insensitive semantic.

13. The computing device for performing predicate evaluation according to claim 9, wherein the compressed variable length character string is obtained by using a compression-encoding manner in which an order of the compression-encoded data is consistent with an order in the trailing blank sensitive semantic.

14. A computer program product for performing predicate evaluation on a compressed variable length character string, the computer program product comprising:

a non-transitory storage medium readable by a processing circuit and storing instructions for execution by the processing circuit for performing a method comprising:

determining, by a processor, upper and lower boundaries of a false positive range for a predicate, the false positive range for the predicate being a range in which a result of the predicate evaluation may lead to a false positive error;

compression-encoding the upper and lower boundaries of the false positive range;

performing a first comparison for comparing the compressed variable length character string with the compression-encoded upper and lower boundaries of the false positive range;

determining a result of the predicate evaluation based on at least a result of the first comparison;

determining upper and lower boundaries of a false negative range for the predicate, the false negative range for the predicate being a range in which a result of the predicate evaluation may lead to a false negative error;

compression-encoding the upper and lower boundaries of the false negative range; and performing a second comparison for comparing the compressed variable length character string with the compression-encoded upper and lower boundaries of the false negative range, wherein said determining the result of the predicate evaluation based on at least the result of the first comparison comprises determining the result of the predicate evaluation based on the result of the first comparison and a result of the second comparison, said determining the result of the predicate evaluation based on the result of the first comparison and the result of the second comparison further comprises:

determining, by the processor, a first evaluation result to be true in response that the compressed variable length character string is within a range defined by the compression-encoded upper and lower boundaries of the false positive range, and otherwise determining the first evaluation result to be false;

determining, by the processor, a second evaluation result to be true in response that the compressed variable length character string is within a range defined by the compression-encoded upper and lower boundaries of the false negative range, and otherwise determining the second evaluation result to be false;

determining, by the processor, the result of the predicate evaluation to be the first evaluation result in response that the first evaluation result is consistent with the second evaluation result; and decompressing, in response that the first evaluation result is inconsistent with the second evaluation result, the compressed variable length character string and performing the predicate evaluation on the decompressed variable length character string to obtain the result of the predicate evaluation.

\* \* \* \* \*